United States Patent
Fraser

[15] 3,701,121
[45] Oct. 24, 1972

[54] FINE GRAIN FERROELECTRIC CERAMIC OPTICAL DISPLAY DEVICE UTILIZING THERMAL DEPOLING WRITE-IN

[72] Inventor: David Bruce Fraser, Berkeley Heights, N.J.

[73] Assignee: Bell Telephone Laboratories, Incorporated, Murray Hill, N.J.

[22] Filed: April 22, 1970

[21] Appl. No.: 30,633

[52] U.S. Cl...............................340/173.2
[51] Int. Cl.................................G11c 11/22
[58] Field of Search.......340/173.2, 173 LS, 173 CL, 340/174.1 M

[56] References Cited

UNITED STATES PATENTS 3,559,185  1/1971  Burns et al..........340/173 LM
3,434,122  3/1969  Land et al............340/173.2
3,368,209  2/1968  McGlauchlin et al.............340/174.1 M Primary Examiner—Robert L. Griffin
Assistant Examiner—Barry L. Leibowitz
Attorney—R. J. Guenther and Arthur J. Torsiglieri

[57] ABSTRACT

An optical display device includes a fine grain polycrystalline ferroelectric ceramic plate, which is located between an optical polarizer and an analyzer. The ferroelectric plate is "reset" by means of an applied electric field, which electrically polarizes the entire plate. Then, the plate is subjected to a "write-in" by means of an intensity modulated scanning electron (or laser) beam, which locally heats and thereby selectively depolarizes portions of the plate. The plate is then subjected to a "readout" beam of light, which is selectively transmitted through the device at those portions of the plate which have been exposed to maximum intensity of the "write-in" beam.

10 Claims, 1 Drawing Figure

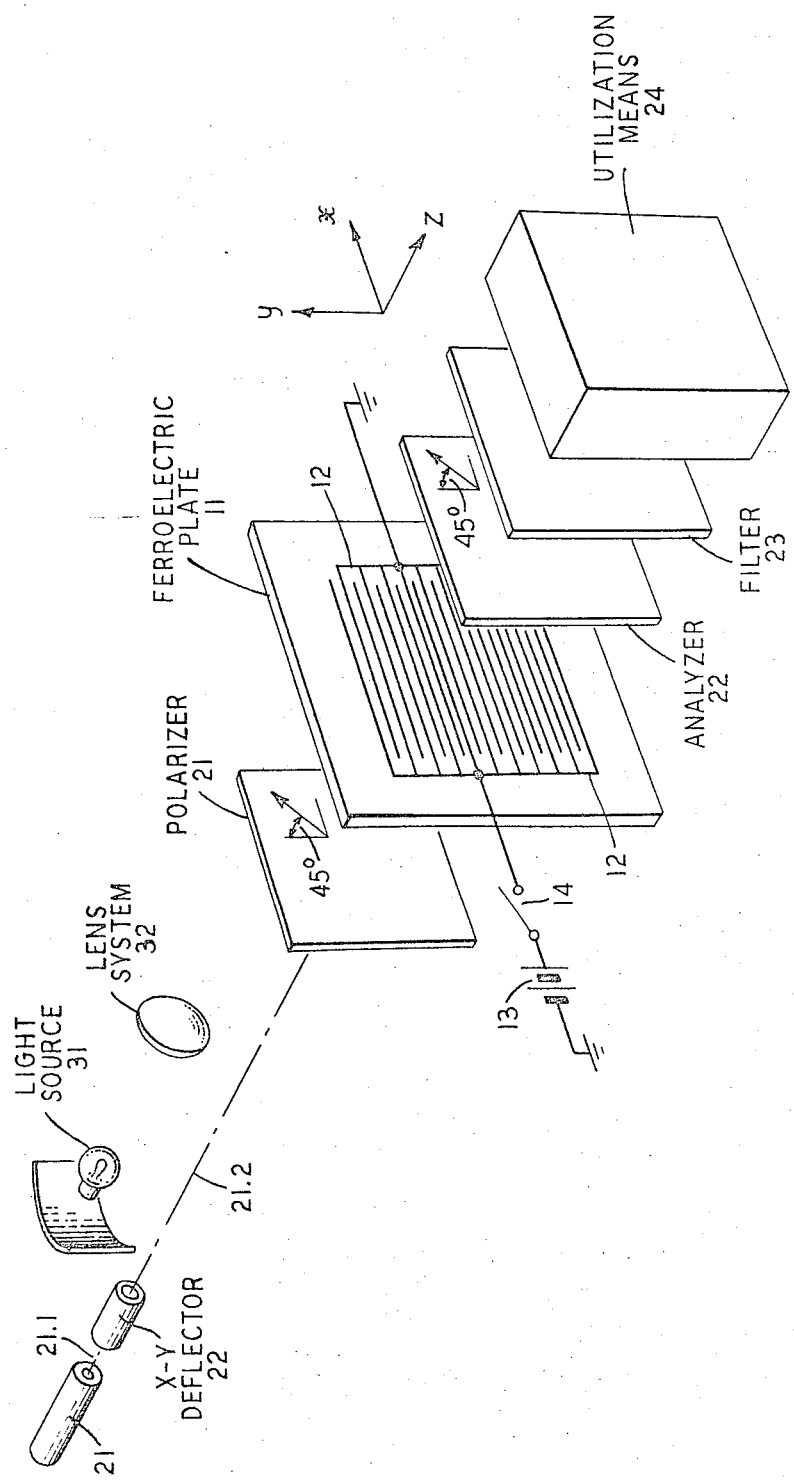

FINE GRAIN FERROELECTRIC CERAMIC OPTICAL DISPLAY DEVICE UTILIZING THERMAL DEPOLING WRITE-IN

FIELD OF THE INVENTION

This invention relates to the field of optical memory systems, in particular to optical image storage and display devices utilizing ferroelectric materials as memory elements.

BACKGROUND OF THE INVENTION

In copending patent applications, Ser. No. 889,087, filed Dec. 30, 1969 (now U. S. Pat. No. 3,609,002, issued on Sept. 28, 1971) (Fraser-Maldonado-Meitzler) (one of the inventors in common with the present invention) and Ser. No. 672, filed Jan. 5, 1970 (J. R. Maldonado and A. H. Meitzler), there are described various optical image storage and display systems utilizing fine grain ferroelectric ceramics as the memory element. In those systems, photoconductive and electrode layers are disposed on the memory element in order to apply an electric field to the portions of the ferroelectric ceramic as selected by means of an optical WRITE-IN beam which locally renders the photoconductor electrically conducting. These electric fields, in turn, modify the state of electric polarization and hence, birefringence of the ferroelectric ceramic. "Readout" of the state of polarization was accomplished by locating the ferroelectric between polarizer and analyzer in the presence of a readout beam of light. However, the use of photoconductive layers involves an expensive and complex technology; and therefore it would be desirable to have an image storage and display system utilizing the advantageous optical properties of fine grain ferroelectric ceramics in optical storage and display devices without the need of these photoconductive layers.

SUMMARY OF THE INVENTION

This invention is based on my discovery that an electrically polarized fine grain ferroelectric ceramic can effectively be selectively depolarized by means of localized heating produced by means of a scanning beam. Thus, for example, either a narrow beam of electrons or a narrow laser beam can be used to heat selected portions of a polarized fine grain ferroelectric ceramic plate and thereby to depolarize those (and only those) portions thereof. Readout of the resulting pattern of polarization of the plate is accomplished by locating the plate between a pair of parallel polarizers in the presence of an incident optical readout beam.

In a specific embodiment of this invention, the fine grain ceramic is a parallel plate of lead zirconate-lead titanate (65–35 atomic percent) doped with lanthanum (2 percent by weight). For reasons set forth below, the size of the crystal grains in this plate is advantageously in the range of about 1 to 2 microns in diameter. Upon a major surface of the plate is disposed, typically by vapor deposition techniques, an interdigitated pair of electrodes. A voltage is applied across the pair of electrodes, in order to produce an electric field in the plate underneath the spaces between electrodes. The direction of this electric field in the plate is parallel to the major surface of the plate; and therefore this field electrically polarizes the plate along this direction. Thereby, a birefringence is induced in the plate everywhere underneath the spaces between the interdigitated electrodes. Write-in of an image pattern onto the plate is accomplished by an intensity modulated scanning electron beam, which selectively heats certain portions of the plate to a temperature sufficient to depolarize only those portions of the plate and thereby to destroy the birefringence thereat. Readout of the image pattern is accomplished by means of a beam of light traversing the whole plate located between polarizer and analyzer.

The average size of the crystals in the ferro-electric ceramic plate grains limits the resolution thereof; for, the smaller the size of the crystal grains, the better will be the resolution of the plate. Thus, fine grain ceramics are desirable in this invention. However, undesirable scattering loss of the readout beam of light increases with decreasing size of the grains. Thus, a trade-off is to be made with respect to the selection of the grain size; so that, for example, the grain size in the case of lead zirconate-lead titanate doped with lanthanum (65/35–2%), the advantageous range of grain size is between about 1 and 2 microns.

This invention, together with its features, objects, and advantages may be better understood from the following detailed description when read in conjunction with the drawing in which:

FIG. 1 illustrates an optical image storage and display system, according to an embodiment of this invention.

DETAILED DESCRIPTION

As illustrated in FIG. 1, a fine grain ferroelectric ceramic plate 11 is located between an optical polarizer 21 and an analyzer 22. Advantageously, the plate 11 is composed of hot-pressed lead zirconate-lead titanate doped with lanthanum (65/35–2%). Upon a major surface of the plate 11 is disposed a pair of opaque interdigitated electrodes 12 parallel to the horizontal X direction. Across these electrodes 12, a voltage can be applied from the battery 13 by closing the switch 14.

When the switch 14 is closed, electric fields are produced in the plate 11 in the regions thereof underneath the horizontal strip-shaped spaces between the electrodes 12. These electric fields electrically polarize the ferroelectric material of the plate 11 in the vertical ($\pm y$) direction.

A source 21 of a modulated beam 21.1 is positioned behind an X-Y deflector 22 of said beam in order to form a modulated XY scanning beam 21.2 which is incident upon the plate 11, while the switch 14 is open. The source 21 of the beam 21.1 can take the form of an electron gun typically of the order of 10 keV, or a laser source typically in the range of 3,500 to 4,000 Angstroms. While the switch 14 is open, the scanning beam 21.2 selectively heats portions of the plate 11 to a temperature $T_D$ which is sufficient to depolarize these portions. For example, a 25 milliwatt beam having a cross-sectional diameter of about 2 microns can depolarize a target portion of the plate 11 in about 15 microseconds. Thereby, the plate 11 is impressed with a two-dimensional pattern of polarization in which some portions of the plate 11 are still polarized and other portions are not polarized, depending upon the selected time pattern of modulation imposed upon the beam 21.2. The pattern of electrical polarization persists in the plate 11 due to its ferroelectric memory property.

Readout of the pattern of polarization in the plate 11 is obtained by means of a source of visible light 31 incident upon the plate 11 through the lens system 32 and the polarizer 21, while the switch 14 is open. Advantageously, the axis of the polarizer 21 is oriented at an angle of 45° with respect to the horizontal X-axis. Upon traversing this plate 11, the horizontal and vertical components of the light from this source 31 undergo relative retardation only at those portions of the plate which were not heated to the temperature $T_D$ by the modulated scanning beam 21.2. Thus, upon traversing the optical analyzer 22 oriented with its axis parallel to that of the polarizer 21, the light from the source 31 is darkened or extinguished only at those portions of the cross section of this light which traverse the portions of the plate 11 which are still electrically polarized by reason of the previous closing of switch 14. Advantageously, the source 31 is of a wavelength(s) which correspond to a half-wavelength relative retardation of the X with respect to the Y optical polarization thereof upon traversing the electrically polarized portions of the plate 11; that is, the plate 11 has a thickness corresponding to a "half-wave" plate for this wavelength. Thereby, the direction of polarization of the light from the source 31 is rotated by 90° upon traversing the polarized portions of the plate 11. Thus, upon traversing the analyzer 22, whose axis is oriented parallel to the axis of the polarizer 21, complete extinction of the light from the source 31 occurs over the cross section thereof traversing the electrically polarized portions of the plate 11; whereas transmission of the light from the source 31 occurs over the cross section thereof traversing the unpolarized portions of the plate 11.

Due to the memory property of ferroelectric with respect to the pattern of electrical polarization therein, the readout by the source 31 of light can be accomplished independent of, i.e., either simultaneously or subsequent to, the write-in by the beam 21.2. The electrical polarization in whole plate 11 can be reset by momentarily closing the switch 14, thereby once again polarizing the entire plate 11. Alternatively, horizontal line by line selective reset can be accomplished by using, instead of the single interdigitated electrode pair 12, a plurality of electrode pairs each of which is separately connected through an individual switch to the battery 13.

A filter 23 which absorbs any of the beam 21.2 incident thereon (but transmits light from the source 31) is advantageously located between utilization means 24 and the plate 11, in order to filter out any undesired amounts of the beam 21.2 otherwise impinging upon the utilization means 24. This utilization means 24 collects and utilizes the light from the source 31 after traversing the lens system 32, the polarizer 21, the plate 11, the analyzer 22, and the filter 23.

Typical parameters for the various components of the system shown in FIG. 1 are as follows:
Width of each electrode in the pair 12: 10 micron
Space between adjacent electrodes: 125 micron
Size of ferroelectric plate 11: 2 cm × 2 cm × 15 micron
Voltage of the battery 13: 500 volts
Temperature for depolarizing the plate 11: $T_D$ 350° C
Energy absorbed by the plate 11 to reach $T_D$: $2 \times 10^{-9}$ joule/(micron)$^3$
Wavelength of source 31: 6,328 A While the above description has been in terms of the choice of parallel optical axes for the polarizer 21 and the analyzer 22, these axes can also be chosen to be mutually perpendicular ("crossed"). In such a case, the portions of the plate 11 which have been depolarized by the beam 21.2 will appear dark and the remainder will appear bright. In practice, this choice depends upon the ON-OFF ratios obtained in either case, which in turn depends upon the relative amount of light scattering by the ferroelectric ceramic material in the plate 11 in its polarized vs. unpolarized state. For the lead zirconate-lead titanate ceramic material mentioned above, it has been found that light scattering of the source 31 is less in the unpolarized portions than in the polarized portions of the plate 11, and therefore the axes of the polarizer 21 and the analyzer 22 are selected to be crossed.

Partial depolarization of portions of the plate 11 by the beam 21.2 can be used for continuous gray tones. This partial depolarization can be obtained by adjustment of the beam 21.2 to heat the plate 11 selectively to temperatures below $T_D$. Moreover, color displays by the plate 11 in conjunction with a white light source 31 can be obtained with the system illustrated in FIG. 1. To achieve color displays, the axes of the polarizer 21 and analyzer 22 are "crossed" so that the depolarized portion of the plate 11 correspond to "black" (dark). By controlling the energy intensity of the beam 21.2 as it impinges upon various portions of the plate 11, and hence the temperatures to which various portions of the plate 11 are heated, the birefringence in the various portions of the plate 11 can be varied from half-wavelength in the red in some portions of this plate 11 to half-wavelength in the blue in other portions thereof. In this mode of operation, the plate 11 advantageously has a thickness corresponding to half-wavelength retardation (in the completely polarized condition of the plate 11) for the wavelength used in the source 31 which is most strongly birefringent in the plate 11.

It should be understood that fine grain ferroelectric ceramics, other than the lanthanum doped lead zirconate-lead titanate described above, can be used as they become available in the art. In such cases, the parameters given above will be modified in accordance with the optical and polarization properties of the ceramic, as should be obvious to the skilled worker after reading the above disclosure.

What is claimed is:

1. An optical image storage and display which comprises:
   a. a fine grain ferroelectric ceramic plate;
   b. voltage means for electrically polarizing the plate, whereby a first state of significant birefringence is induced in the plate with respect to a readout beam of light transmitted through the plate; and
   c. means for forming a write-in beam which is incident upon a pattern of selected portions of the plate initially in the first state, the beam being of sufficient intensity for a predetermined time to heat said portions to a predetermined temperature which is sufficient to depolarize only said portions of the plate so that a second state is induced in only said portions of the plate, whereby a predetermined two-dimensional pattern of first and second states is produced in the plate, the portions of the plate in the second state being not significantly birefringent.

2. A device according to claim 1 in which the plate is essentially lanthanum doped lead zirconate-lead titanate.

3. A device according to claim 1 which further includes an optical polarizer and an optical analyzer positioned on opposite sides of the plate.

4. A device according to claim 1 which further includes a pair of interdigitated electrodes disposed on a major surface of the plate, the voltage means being electrically connected to said electrodes.

5. The device recited in claim 1 in which the write-in beam is an intensity modulated scanning beam of electrons.

6. The device recited in claim 1 in which the means for forming the write-in beam is a laser, and which further includes a filter located on the side of the plate away from the laser, the filter being adapted to absorb the write-in beam after transmission through the plate.

7. An optical image storage and display system which comprises:
   a. the device recited in claim 1; and
   b. means for forming the readout beam of light.

8. The system recited in claim 7 in which the plate is essentially lanthanum doped lead zirconate-lead titanate.

9. An optical image storage and display system which comprises:
   a. the device recited in claim 5;
   b. an intensity modulated electron gun, in order to supply the write-in beam; and
   c. means for deflecting and directing the write-in beam onto the plate in accordance with the pattern.

10. The system recited in claim 9 in which the plate is essentially lead zirconate-lead titanate doped with lanthanum.

* * * * *